March 17, 1925.

R. BARLOW

FISHLINE SINKER

Filed Sept. 22, 1924

1,530,027

INVENTOR
*Robert Barlow.*

BY
*Albert E Dieterich*
ATTORNEY

Patented Mar. 17, 1925.

1,530,027

UNITED STATES PATENT OFFICE.

ROBERT BARLOW, OF BAMBERTON, BRITISH COLUMBIA, CANADA.

FISHLINE SINKER.

Application filed September 22, 1924. Serial No. 739,078.

*To all whom it may concern:*

Be it known that I, ROBERT BARLOW, citizen of the Dominion of Canada, residing at Bamberton, Vancouver Island, in the Province of British Columbia, Canada, have invented certain new and useful Improvements in Fishline Sinkers, of which the following is a specification.

This invention relates to a sinker for a fish trolling line and is designed to release the weight of the sinker when a fish has been hooked, and it is necessary to relieve the line of all obstruction that will interfere with playing and landing the fish.

In trolling for salmon the bait flight requires to be sunk to a considerable depth for which a relatively heavy weight is necessary and when a fish is hooked that weight forms a serious obstruction to playing and landing the fish.

In the device, which is the subject of this application, the sinker comprises an elongated hollow body which is weighted with sand or small gravel. One end of this body is connected to the trolling line, while the other end is closed by a cover to which the bait flight is connected in a manner that the cover will be withdrawn when a fish is hooked, and the weighty contents of the hollow body will be discharged.

The invention is particularly described in the following specification, reference being made to the drawings by which it is accompanied, in which.

Figure 1:
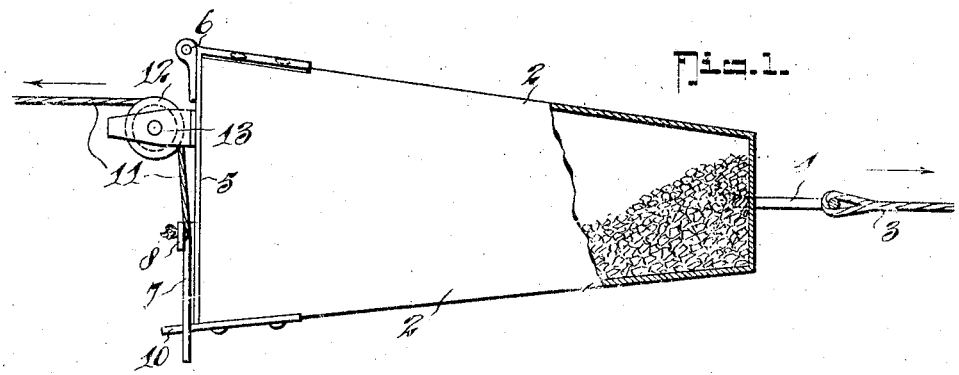
Fig. 1 is a side elevation and part section of the sinker showing its connection to the trolling line and the hook and bait flight.
Figures 2, 3:
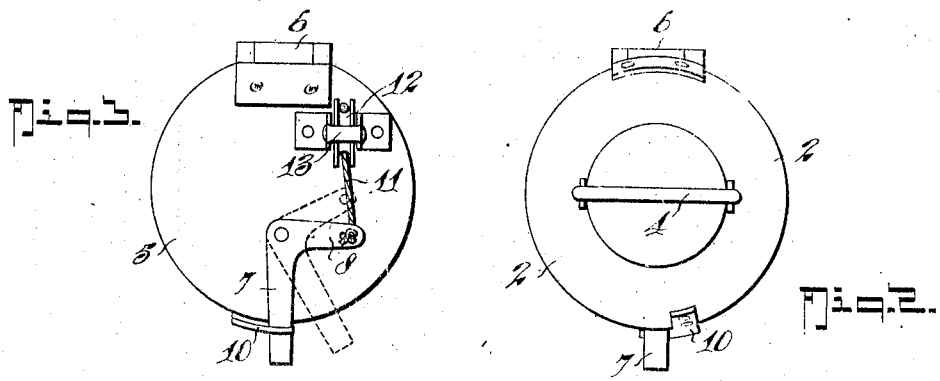
Figs. 2 and 3 are end views of the forward and after end of the vessel respectively.

In these drawings 2 represents an elongated, hollow container, preferably frustroconical. The smaller end of this container may be either open, as shown in Fig. 2, or closed as in Fig. 1, and is connected to the trolling line 3 by a bale or loop 4. The larger end is closable by a disc door 5 hinged at 6 to the container and retained in the closed position by one arm 7 of a bell crank pivoted at 9 to the cover, which arm engages a keeper 10 secured to the body of the container 2 and notched to receive the end of 7.

To the other arm 8 of this bell crank the hook and bait flight 11 is connected, the line passing around a small sheave 12 in a bracket 13 secured to the door 5 adjacent its hinge 6.

Figure 4:
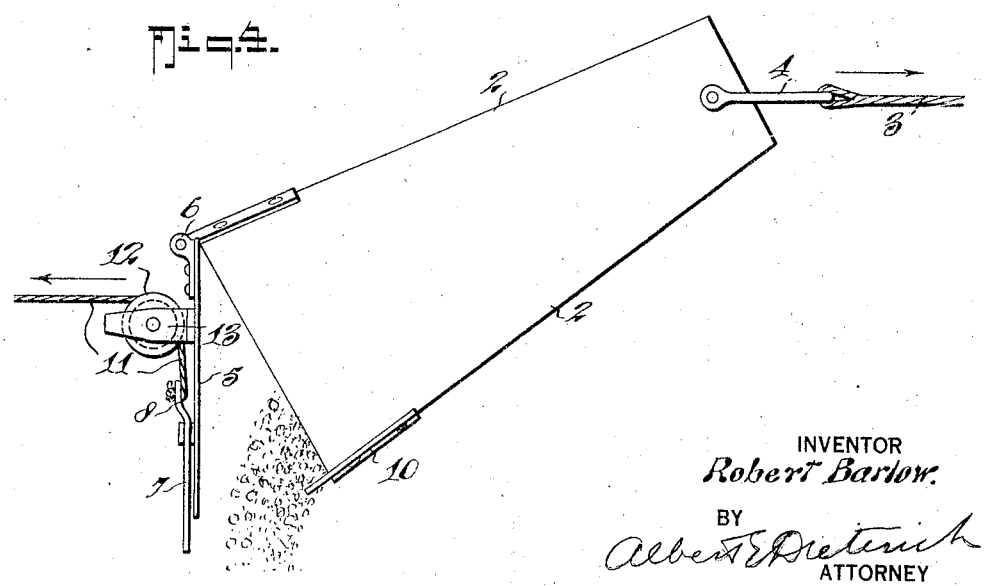
Fig. 4 is a side elevation showing the hollow sinker as tilted to release its weight as when a fish is hooked.

In use, the container 2 is charged with sand or small gravel to the required weight, and the door 5 is closed and secured by the arm 7 of the bell crank. The friction of the latch bolt 7 in the keeper 10 is sufficient to retain the door in the closed position while trolling, but when a fish takes the hook, the tension on the hook flight will withdraw the end 7 of the bell crank lever from its engagement with the keeper 10 to the position indicated by dot and dash lines in Fig. 3, which will free the end door 5 and permit the container to tilt, as represented in Fig. 4, to deliver the contents of the vessel 2 and relieve the line of that weight obstruction.

When the smaller end of the container 2 is open, as in Fig. 2, the preponderating weight being at the larger end, it will, in use, hang with that end downward and avoid spilling the contents, and it has the advantage that when the door is tripped and opened, the water being free to pass through it, it will offer less resistance to the line being hauled in.

The device not only enables the line to be relieved of the weight of the sinker when a fish is hooked, but also affords a convenient means of regulating the weight to what is desired, as more or less of the inexpensive sand or gravel can be charged into the hollow body to suit requirements.

While the form of the truncated cone, as illustrated, is the most favourable when the forward end is open, I do not desire to be confined to that shape, as when the forward end is closed, the container may be generally cylindrical and pointed at the forward end, as shown in Fig. 5, to facilitate movement through the water.

Having now particularly described my invention, I hereby declare that what I claim as new and desire to be protected in by Letters Patent, is:

1. A fish line sinker, comprising a hollow body one end of which is connected to the trolling line, said hollow body adapted to be charged with a material affording the required sinking weight, and means operable by the pull of a fish on the hook flight for emptying the contents of the hollow body.

2. A fish line sinker, comprising a hollow body adapted to receive a loose weighty material, one end of which body is connected to the trolling line, a door closing the other end of the body, means for retaining the door in the closed position, and means for connecting the hook flight of the line to the door retaining means whereby the pull of a fish when hooked will release the door and permit the body to empty its contents.

3. A fish line sinker, comprising a relatively elongated hollow body adapted to receive a loose weighty material, means for connecting the trolling line to one end, a hinged door closing the other end, means for retaining the door in the closed position, means for connecting the hook flight to the door retaining means, whereby when a fish is hooked the pull of the fish will withdraw the retaining means and permit the vessel to empty its contents.

4. A fish line sinker, comprising an elongated hollow body having a closed end and adapted to be charged with a material affording the required sinking weight, means for connecting the trolling line to the closed end of the hollow body, a door hinged to close the open end, a latch retaining the door in the closed position, a small sheave mounted on the door adjacent the hinge, and a hook flight passing around the sheave and connected to the door retaining latch whereby the pull of a fish when hooked will withdraw the latch and open the door to empty the contents of the hollow body.

In testimony whereof I affix my signature.

ROBERT BARLOW.